United States Patent
Johnson (10) Patent No.: US 10,323,545 B2
(45) Date of Patent: Jun. 18, 2019

(54) HEAT ENGINES, SYSTEMS FOR PROVIDING PRESSURIZED REFRIGERANT, AND RELATED METHODS

(71) Applicant: Heat Source Energy Corp., Salem, UT (US)

(72) Inventor: Keith Sterling Johnson, Salem, UT (US)

(73) Assignee: Heat Source Energy Corp., Mountain Home, ID (US)

( * ) Notice: Subject to any disclaimer, the term of this patent is extended or adjusted under 35 U.S.C. 154(b) by 0 days.

(21) Appl. No.: 15/576,566

(22) PCT Filed: May 25, 2016

(86) PCT No.: PCT/US2016/034178
§ 371 (c)(1),
(2) Date: Nov. 22, 2017

(87) PCT Pub. No.: WO2016/196144
PCT Pub. Date: Dec. 8, 2016

(65) Prior Publication Data
US 2018/0156072 A1 Jun. 7, 2018

Related U.S. Application Data

(60) Provisional application No. 62/169,971, filed on Jun. 2, 2015.

(51) Int. Cl.
*F01K 13/00* (2006.01)
*F01K 21/00* (2006.01)
(Continued)

(52) U.S. Cl.
CPC ............ *F01K 21/005* (2013.01); *F01K 25/04* (2013.01); *F01K 25/065* (2013.01); *F01K 23/065* (2013.01); *F01K 25/10* (2013.01)

(58) Field of Classification Search
CPC ...... F01K 21/005; F01K 25/04; F01K 25/065; F01K 23/065
(Continued)

(56) References Cited

U.S. PATENT DOCUMENTS 7,637,108 B1    12/2009   Langson
9,382,816 B2 *  7/2016    Almbauer ............ C10M 171/00
(Continued)

FOREIGN PATENT DOCUMENTS

CN            1755297 A      4/2006
CN          104625866 A      5/2015
(Continued)

OTHER PUBLICATIONS

International Search Report from International Application No. PCT/US2016/034178, dated Oct. 19, 2016, 4 pages.
(Continued)

*Primary Examiner* — Jason D Shanske
(74) *Attorney, Agent, or Firm* — TraskBritt (57) ABSTRACT

A method for generating power from a heat source includes mixing a refrigerant in a liquid phase with a lubricating oil, heating the mixture to evaporate the refrigerant, mixing the heated mixture with additional refrigerant in a superheated phase, and atomizing the lubricating oil to disperse the lubricating oil within the refrigerant. The atomized lubricating oil and the refrigerant are passed through a decompressor to generate an electrical current. The refrigerant may be an organic material having a boiling point below about −35 C. Related systems and heat engines are also disclosed.

17 Claims, 3 Drawing Sheets

(51) Int. Cl.
*F01K 25/04* (2006.01)
*F01K 25/06* (2006.01)
F01K 23/06 (2006.01)
F01K 25/10 (2006.01)

(58) Field of Classification Search
USPC .......................................................... 60/645
See application file for complete search history.

(56) References Cited

U.S. PATENT DOCUMENTS

| | | | |
|---|---|---|---|
| 9,416,727 B2* | 8/2016 | Lancaster | F01K 23/065 |
| 9,500,101 B2* | 11/2016 | Tsuboi | F01K 25/06 |
| 9,745,870 B2* | 8/2017 | Johnson | F01K 3/262 |
| 2004/0216460 A1 | 11/2004 | Ruggieri et al. | |
| 2006/0236698 A1 | 10/2006 | Langson | |
| 2007/0101735 A1 | 5/2007 | Matsui et al. | |
| 2010/0034684 A1 | 2/2010 | Ast et al. | |
| 2010/0058755 A1 | 3/2010 | Carter | |
| 2010/0212873 A1 | 8/2010 | Poole et al. | |
| 2011/0167818 A1 | 7/2011 | Tsuchino et al. | |
| 2012/0006023 A1 | 1/2012 | Johnson et al. | |
| 2012/0318001 A1 | 12/2012 | Takayama et al. | |
| 2013/0263598 A1 | 10/2013 | Almbauer et al. | |
| 2015/0369086 A1* | 12/2015 | Johnson | F01K 3/262 60/657 |

FOREIGN PATENT DOCUMENTS

| | | |
|---|---|---|
| DE | 102010022408 A1 | 12/2011 |
| RU | 2435050 C2 | 11/2011 |
| WO | 2007008225 A2 | 1/2007 |
| WO | 2011088041 A1 | 7/2011 |
| WO | 2011151029 A2 | 12/2011 |
| WO | 2014117156 A1 | 7/2014 |
| WO | 2014124061 A1 | 8/2014 |

OTHER PUBLICATIONS

International Written Opinion from International Application No. PCT/US2016/034178, dated Oct. 19, 2016, 4 pages.
Chinese Office Action and Search Report from Chinese Application No. 201680031262.1, dated Dec. 29, 2018, 6 pages.

* cited by examiner

HEAT ENGINES, SYSTEMS FOR PROVIDING PRESSURIZED REFRIGERANT, AND RELATED METHODS

CROSS-REFERENCE TO RELATED APPLICATION

This application is a national phase entry under 35 U.S.C. § 371 of International Patent Application PCT/US2016/034178, filed May 25, 2016, designating the United States of America and published in English as International Patent Publication WO 2016/196144 A1 on Dec. 8, 2016, which claims the benefit under Article 8 of the Patent Cooperation Treaty to U.S. Provisional Patent Application Ser. No. 62/169,971, filed Jun. 2, 2015.

TECHNICAL FIELD

Embodiments of the present disclosure relate generally to systems and methods for power generation and other processes involving compressed refrigerants. For example, the systems and methods may be used for generating electricity from a heat source.

BACKGROUND

The Rankine cycle is a thermodynamic cycle in which heat is converted into work. The heat is supplied externally to a closed loop, typically with water as the working fluid. The Rankine cycle generates about 80% of all electric power used throughout the world, and is used by solar thermal, biomass, coal and nuclear power plants. Rankine-cycle power systems typically transform thermal energy into electrical energy. A conventional Rankine cycle power system employs the following four basic steps: (1) thermal energy is used, in a boiler, to turn water into steam; (2) the steam is sent through a turbine, which, in turn, drives an electric generator; (3) the steam is condensed back into water by discharging the remaining thermal energy in the steam to the environment; and (4) the condensate is pumped back to the boiler. In an ideal Rankine cycle, the expansion is isentropic (i.e., at constant entropy) and the evaporation and condensation processes are isobaric (i.e., at constant pressure). However, irreversibilities in real processes lower cycle efficiency. Those irreversibilities are primarily attributable to two factors: conversion of some energy into heat during expansion of the working fluid during step (2) of the cycle; and inefficiency caused by pressure drops in the heat exchangers during steps (1) and (3).

The efficiency of a Rankine cycle is a function of the physical properties of the working fluid. Without the pressure reaching supercritical levels for the working fluid, the temperature range over which the cycle can operate is quite small. For example, conventional turbine entry temperature limits are around 565° C. (the creep limit of stainless steel) and condenser temperatures are around 30° C. This gives a theoretical Carnot efficiency of about 63% compared with an actual efficiency of 42% for a modern coal-fired power station. Low turbine entry temperature (compared with an internal-combustion gas turbine) is why the Rankine cycle is often used as a bottoming cycle in combined-cycle gas turbine power stations. The working fluid in a Rankine cycle follows a closed loop and is re-used continually. While many working fluids can and have been used in the Rankine cycle, water is usually the fluid of choice because it is abundant, inexpensive, nontoxic, generally non-reactive, and possesses favorable thermodynamic properties. Organic Rankine cycles (ORCs) have been developed to enable recovery of energy from lower temperature sources, such as industrial waste heat, geothermal heat, solar ponds, etc. Working fluids in ORCs are organic, high molecular mass fluids having a liquid-vapor phase change (i.e., boiling point) at a lower temperature than the water-steam phase change at a given pressure. Using an ORC, heat from lower temperature sources can be converted to useful work that can be harnessed to generate electricity.

ORC technology can be used to recover energy from waste heat. For example, the technology can be applied to heat and power plants, industrial and farming processes (e.g., organic products fermentation), hot exhausts from ovens or furnaces, flue gas condensation, exhaust gases from vehicles, intercooling of a compressor, and the condenser of a power cycle. ORC technology can also be used to extract useful energy from biomass, geothermal heat sources, solar fields, etc.

ORCs are described in International Patent Publication No. WO 2014/124061, titled "Improved Organic Rankine Cycle Decompression Heat Engine," published Aug. 14, 2014, the entire disclosure of which is hereby incorporated herein by this reference.

BRIEF SUMMARY

In some embodiments, a method includes mixing a lubricating oil with a first portion of a refrigerant in a liquid phase to form a mixture and heating the mixture of the lubricating oil and the first portion of the refrigerant to form a heated mixture, wherein at least a portion of the first portion of the refrigerant is in a gaseous phase. The method includes mixing the heated mixture with a second portion of the refrigerant in a superheated phase and atomizing the lubricating oil to disperse the lubricating oil within the refrigerant. The refrigerant may exhibit a boiling point below about −35° C. In some embodiments, the refrigerant may include an organic material.

In other embodiments, a heat engine includes a high-pressure zone configured to transfer heat from at least one heat source to a refrigerant and configured to contain a first portion of the refrigerant in a gaseous phase; a low-pressure zone configured to transfer heat from the refrigerant to at least one heat sink and configured to contain a second portion of the refrigerant in a liquid phase; a bypass zone configured to mix a third portion of the refrigerant in a liquid phase with a lubricating oil; and an atomizer comprising a mixing media configured to atomize the lubricating oil and disperse the lubricating oil within the first and third portions of the refrigerant. The refrigerant exhibits a boiling point below about −35° C. A substantially closed-loop path for the refrigerant comprises the high-pressure zone, the low-pressure zone, and the bypass zone.

In some embodiments, a system for providing a pressurized refrigerant includes a pump configured to move a first portion of a refrigerant in a liquid phase through a conduit; a mixing device for mixing a lubricating oil with the first portion of the refrigerant in the liquid phase; at least one heat source configured to transfer heat to the first portion of the refrigerant in the liquid phase; another mixing device for mixing a second portion of the refrigerant in a gaseous phase with the lubricating oil and the first portion of the refrigerant; and a mixing media configured to atomize the lubricating oil and disperse the lubricating oil within the refrigerant. The refrigerant exhibits a boiling point below about −35° C.

The at least one heat source is configured to evaporate the first portion of the refrigerant.

DETAILED DESCRIPTION

The following description provides specific details, such as material types, compositions, material thicknesses, and processing conditions in order to provide a thorough description of embodiments of the disclosure. However, a person of ordinary skill in the art will understand that embodiments of the disclosure may be practiced without employing these specific details. Indeed, embodiments of the disclosure may be practiced in conjunction with conventional techniques employed in the industry. In addition, the description provided below does not form a complete process flow for providing pressurized fluids or operating heat engines. Only those process acts and structures necessary to understand the embodiments of the disclosure are described in detail below. A person of ordinary skill in the art will understand that some process components (e.g., pipes, line filters, valves, temperature detectors, flow detectors, pressure detectors, etc.) are inherently disclosed herein and that adding various conventional process components and acts would be in accord with the disclosure. Additional acts or materials may be provided by adding conventional elements to those disclosed.

As used herein, the singular forms "a," "an," and "the" are intended to include the plural forms as well, unless the context clearly indicates otherwise.

As used herein, the term "and/or" includes any and all combinations of one or more of the listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially," in reference to a given parameter, property, or condition, means to a degree that one of ordinary skill in the art would understand that the given parameter, property, or condition is met with a small degree of variance, such as within acceptable manufacturing tolerances.

Figure 1:
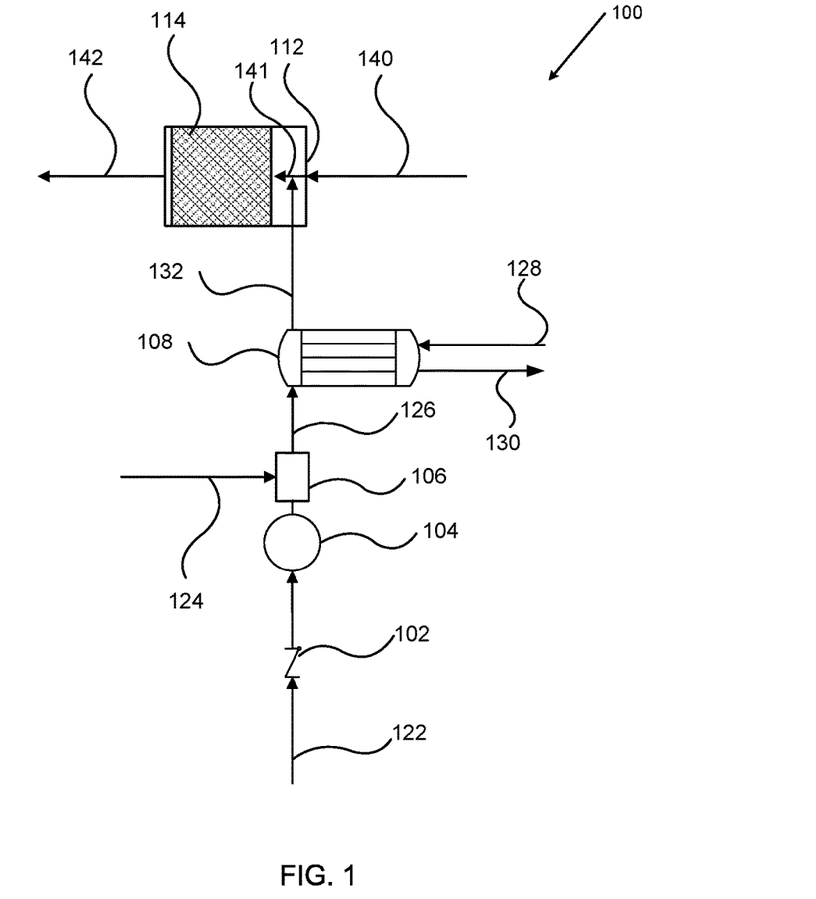
FIG. 1 is a simplified schematic block diagram illustrating a system for providing a pressurized refrigerant, according to the present disclosure.

FIG. 1 is a simplified schematic block diagram illustrating a system 100 for providing a pressurized refrigerant. The system 100 may be used to provide pressurized refrigerant to a heat engine, a refrigeration system, a heat pump, or any other system in which pressurized refrigerant is used. In some embodiments, the system 100 may provide pressurized refrigerant to a heat engine using an organic Rankine cycle (ORC).

As shown in FIG. 1, the system 100 may include a check valve 102 configured to enable flow of refrigerant in only one direction. A pump 104 may be configured to receive refrigerant from the check valve 102 and provide a force to drive refrigerant through the system 100. The pump 104 may be, for example a variable speed circulation pump. The pump 104 may be significantly smaller than pumps conventionally used for providing pressurized refrigerants because the pump 104 need not significantly increase the pressure of the refrigerant. Instead, the refrigerant pressure may be increased by heating, as explained in further detail below.

The refrigerant may be an organic material having a boiling point below about $-35°$ C. Such a refrigerant may be used to extract energy from heat sources having relatively low temperatures (e.g., below about $82°$ C.) and convert that energy into electricity more efficiently than refrigerants in conventional systems. For example, the refrigerant may be R-410A, a near-azeotropic mixture of difluoromethane and pentafluoroethane, which has a boiling point of approximately $-51°$ C. Other refrigerants may also be used, such as those known in the art as R-22, R-502, R-507, R-13, R-503, R-23, R-717 (ammonia), or R-744 (carbon dioxide ($CO_2$)). Such refrigerants are commercially available, for example, from Airgas Refrigerants, Inc., of Lawrenceville, Ga., USA.

A mixing device 106 may be configured to mix lubricating oil with the organic refrigerant after the organic refrigerant passes through the pump 104. The mixing device 106 may include, for example, a mixing tee, a mix chamber, an aspirator, or any other means for mixing fluids. The lubricating oil may be an organic material formulated to remain in a liquid phase at the operating conditions of a refrigeration process, and to have beneficial lubrication and stability properties. For example, the lubricating oil may include mineral oil (e.g., napthalenic) or synthetic oils (e.g., glycols, esters, alkylbenzenes, polyolesters, etc.). In some embodiments, the lubricating oil may also include a lubricity enhancer, such as an additive package sold under the trade name A/C Re-New by Nu-Calgon, of St. Louis, Mo., USA. The lubricity enhancer may be formulated to have a higher lubricity than the lubricating oil.

The system 100 may further include one or more heat sources 108 depicted as a heat exchanger in FIG. 1. The one or more heat sources 108 may include condensers, heating coils, or any other heat source. The one or more heat sources 108 may include at least one wall through which heat may be transferred to the organic refrigerant and the lubricating oil. Though one heat source 108 is depicted in FIG. 1, the system 100 may include any number of heat sources, such as one, two, three, four, etc. The one or more heat sources 108 may be configured to evaporate the organic refrigerant to form a gas. For example, the one or more heat sources 108 may include an evaporator or a superheater.

The system 100 may further include an atomizer 112 configured to mix the organic refrigerant and lubricating oil with another portion of organic refrigerant, and to atomize the lubricating oil. The atomizer 112 may include a body having mixing and atomizing means 114 therein. For example, the atomizer 112 may include mixing vanes, a metal mesh (e.g., a sintered stainless steel mesh, such as a 316L stainless steel mesh material having a mesh size of about 1,000 microns, sold by Dorstener Wire Tech, of Spring, Tex., USA, under the name SINTERPORE®), a packing media, or any other structure for mixing and/or atomizing. In some embodiments, the atomizer 112 may further include a filter media (which may be replaceable) or other means to prevent unatomized liquid oil from leaving the atomizer 112. The atomizer 112 may be configured to operate with minimal restriction, such that the pressure drop within the atomizer 112 is small or negligible.

The system 100 may be used to provide a pressurized, heated refrigerant. A refrigerant 122 may pass through the check valve 102 to the pump 104, which pumps the refrigerant 122 through the system 100. In some embodiments, the pump 104 may provide the sole means for circulating the refrigerant 122. The refrigerant 122 leaving the pump 104 may enter the mixing device 106 and mix with a lubricating oil 124 to form a mixture 126. The mixture 126 may then be heated in the heat source 108. The heat source 108 may receive a hot fluid 128 having a temperature of less than about 80° C., less than about 70° C., less than about 60° C., or even less than about 50° C. Heat from the hot fluid 128 is transferred to the mixture 126, such that a cooled fluid 130 (containing material that entered the heat source 108 as the hot fluid 128) and a heated mixture 132 (containing material that entered the heat source 108 as the mixture 126) leave the heat source 108. The volumetric flow rate of the heated mixture 132 may be greater than the volumetric flow rate of the mixture 126 due to evaporation of the refrigerant 122.

The mixture 126 may, in some embodiments, be exposed to additional heat sources. Transferring heat from the heat source 108 to the mixture 126 may involve increasing the specific volume of the mixture 126.

The heat source 108 may include, for example, a waste heat source, an exhaust gas, a compressor intercooler, biomass, a geothermal heat source, a solar array, or any other heat source. The heat source 108 need not be at a temperature as high as those required in conventional systems, so the system 100 may be used to extract energy from heat sources that are traditionally not used for power generation.

The heated mixture 132 (which includes the lubricating oil 124 mixed with the refrigerant 122) and another portion of gaseous or superheated refrigerant 140 may be mixed within the atomizer 112 to form a superheated mixture 141. Alternatively, the heated mixture 132 and the refrigerant 140 may be mixed before entering the atomizer 112 to form the superheated mixture 141, such as in a mixing tee, a mix chamber, an aspirator, or any other means for mixing fluids. The refrigerant 140 may typically have the same composition as the refrigerant 122. The refrigerant 140 may be at or near its critical temperature. Within the atomizer 112, the lubricating oil may become atomized to form a fine mist, which may be dispersed within the refrigerant. For example, the superheated mixture 141 may be passed through a metal mesh. In some embodiments, the lubricating oil 124 may be approximately uniformly dispersed throughout the refrigerant. The refrigerant and the lubricating oil may leave the atomizer 112 as an atomized mixture 142. In some embodiments, the atomized mixture 142 may be filtered or otherwise processed to enhance homogeneity of the atomized mixture 142.

Figure 2:
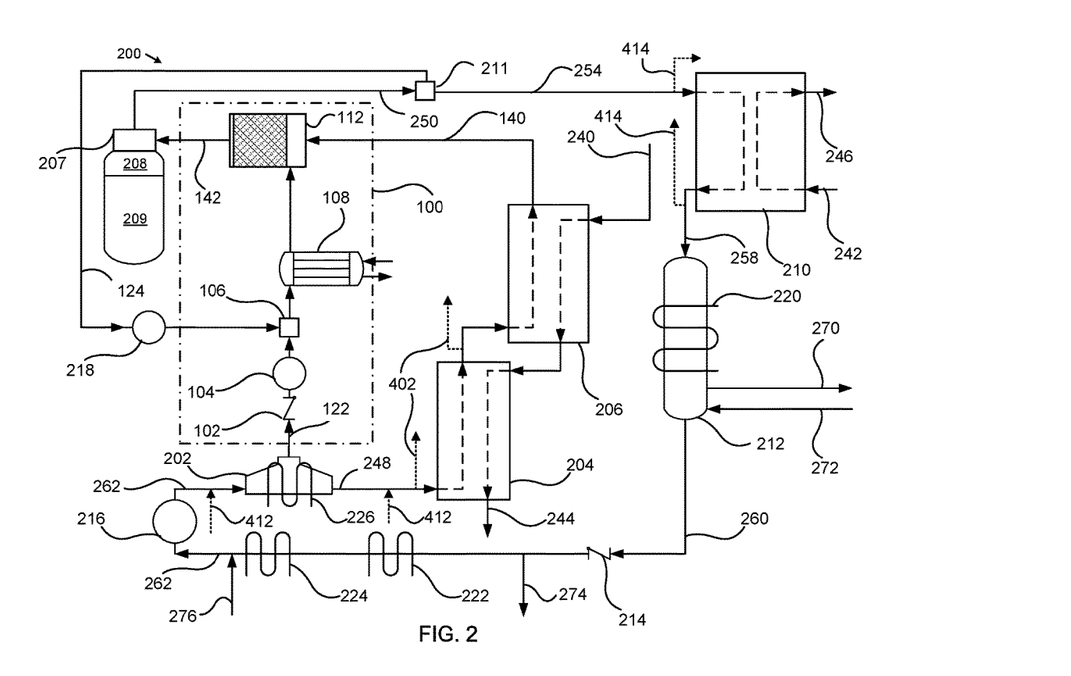
FIG. 2 is a simplified schematic block diagram illustrating a heat engine including the system shown in FIG. 1.

In some embodiments, the atomized mixture 142 (i.e., the pressurized refrigerant and the atomized lubricating oil) may be used in an ORC heat engine. For example, FIG. 2 is a simplified schematic block diagram illustrating a heat engine 200 including the system 100 shown in FIG. 1 (note that the reference numerals for some material flows shown in FIG. 1 are omitted from FIG. 2 for simplicity). The heat engine 200 generally includes a high-pressure zone, a low-pressure zone, and a bypass zone. When the heat engine 200 is in operation, the pressure of the working refrigerant within the high-pressure zone is approximately constant, with variations in temperature along the flow path. Similarly, within the low-pressure zone, the pressure of the working refrigerant is approximately constant (but at a lower pressure than in the high-pressure zone. The refrigerant in the bypass zone is at approximately the same pressure as in the high-pressure zone. Because the high-pressure zone and the low-pressure zone are each at approximately constant pressures, refrigerant may be passed through one or more external loops if additional heat transfer is desired or required, as discussed below and shown in FIG. 3.

The heat engine 200 includes a holding tank 202 for containing refrigerant. Pressurized refrigerant 248 travels from the holding tank 202 to a heat source 204 (e.g., an evaporator) and a superheater 206, which may be generally referred to as heat sources 204, 206. The heat sources 204, 206 may each include at least one wall through which heat may be transferred to the refrigerant 248 from a hot fluid 240. Though two heat sources 204, 206 are depicted in FIG. 2, the heat engine 200 may include any number of heat sources, such as one, two, three, four, etc. One of the heat sources 204, 206 may be configured to evaporate the pressurized refrigerant 248 to form a gas, which may correspond to the refrigerant 140 shown in FIG. 1. After the refrigerant 140 leaves the superheater 206, the refrigerant 140 may be at or near its critical temperature.

The heat sources 204, 206, may receive the hot fluid 240 having a temperature of less than about 80° C., less than about 70° C., less than about 60° C., less than about 50° C., or even less than about 40° C. Heat from the hot fluid 240 is transferred to the refrigerant 248. The hot fluid 240 may leave the heat sources 204, 206 as fluid 244 for disposal or other uses.

The refrigerant 140 may then be mixed with the heated mixture 132 of refrigerant and oil that has been preheated in the heat source 108 (see also FIG. 1). Within the atomizer 112, the lubricating oil 124 may become atomized to form a fine mist, which may be dispersed within the refrigerant 140 as the atomized mixture 142, as discussed above and shown in more detail in FIG. 1.

The atomized mixture 142 may then enter a manifold 207 having an expansion device 208 coupled to and configured to drive an electrical generator 209. The expansion device 208 may include a positive displacement decompressor configured to provide a pressure gradient through which the organic refrigerant in the gaseous phase flows continuously from the high-pressure zone to the low-pressure zone. The expansion device 208 may be configured to maintain a pressure differential between the high-pressure zone and the low-pressure zone of between about 10 bar and about 100 bar, and may be configured to extract mechanical energy due to the pressure gradient. For example, the expansion device 208 may be configured to maintain a pressure differential between the high-pressure zone and the low-pressure zone of between about 20 bar and about 42 bar.

In some embodiments, the expansion device 208 may be a turbine, a decompressor, a twin-screw expander, or any other appropriate device configured to rotate a portion of the electrical generator 209. For example, the expansion device 208 may include an orbital scroll decompressor. The expansion device 208 may include materials formulated to withstand operating conditions. For example, the expansion device 208 may include stainless steel. A mixture 250 leaving the expansion device 208 may be at a relatively lower pressure and a relatively higher temperature than the atomized mixture 142 entering the expansion device 208. Thus, the high-pressure zone of the heat engine 200 may be defined to include the holding tank 202, the heat sources 204, 206, the atomizer 112, and the expansion device 208.

The manifold 207 may be configured to receive the atomized mixture 142 from the atomizer 112 and to provide the mixture 250 at a lower pressure and higher temperature than the atomized mixture 142. The manifold 207 may be configured to use heat from the atomized mixture 142 to assist in separation of oil from the mixture 250. The mixture 250 may rise vertically within the manifold 207 through orifices or a steel mesh. This may promote separation of oil, which tends to be heavier, from refrigerant. The oil may tend to fall back down into the electrical generator 209 below, where it may be reused for sealing and lubrication.

Figure 3:
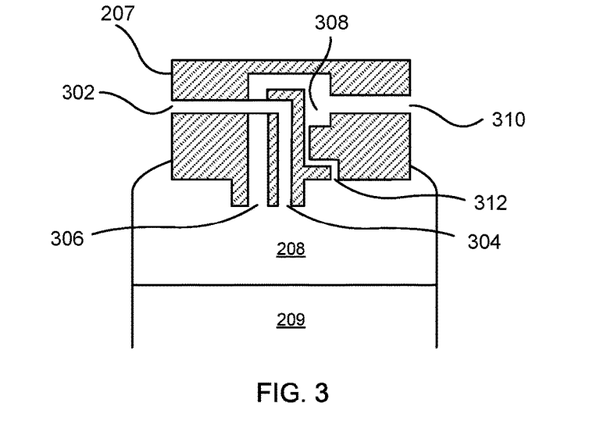
FIG. 3 is a simplified diagram illustrating a manifold that may be used in the heat engine illustrated in FIG. 2.

As shown in FIG. 3, the manifold 207 may include a refrigerant inlet 302 through which the atomized mixture 142 (FIG. 2) may be received. The atomized mixture 142 may pass into the expansion device 208 via a protrusion 304. Refrigerant leaving the expansion device 208 (i.e., as mixture 250, shown in FIG. 2) enters the manifold 207 through an opening 306. The refrigerant travels through a separation region 308, where oil is removed from the refrigerant to form the mixture 250 (FIG. 2), which leaves the manifold 207 via a refrigerant outlet 310. The oil removed may return to the expansion device 208 and/or electrical generator 209 via an oil drain 312.

Combining the refrigerant inlet 302 and the refrigerant outlet 310 may simplify installation of the heat engine 200, and may provide a means to use some heat from the incoming atomized mixture 142 to assist in oil separation. The manifold 207 may include flow paths configured to promote heat transfer between incoming and outgoing refrigerant.

Furthermore, the manifold 207 may include one or more tortuous paths through which the refrigerant may pass before leaving the manifold 207. For example, the opening 306 may include one or a plurality of bored holes or orifices, which may optionally be packed with a steel mesh or other material having a high surface area. Forcing the exhaust vapor to rise vertically through such a path may enhance separation of oil from the refrigerant (e.g., because the oil may be heavier than the refrigerant).

The exhaust vapor may rise vertically within the manifold 207, then flow around sharp edges, before flowing downward again, thus promoting the separation of heavier oil, which may drain downward from the separation region 308 through the opening 306 back to the expansion device 208, based on gravity.

The protrusion 304 may be configured such that the atomized mixture 142 entering the expansion device 208 does not disrupt the flow of the atomized mixture 142 via the separation region 308. For example the protrusion 304 may extend downward from the center of the manifold 207 so as not to allow the atomized mixture 142 entering the expansion device 208 to easily force any mixed oil leaving the expansion device 208 to enter the opening 306. That is, refrigerant leaving the expansion device 208 may enter the manifold 207 through the opening 306 via the protrusion 304, and may retain some oil. Such an arrangement may also promote heat transfer between incoming and outgoing refrigerant, which may enhance oil separation.

The electrical generator 209 may be any device configured to convert mechanical energy extracted from the refrigerant in the expansion device 208 to electrical energy, such as an alternating-current generator having a rotor and a stator. The expansion device 208 may be located vertically above or below the electrical generator 209. In some embodiments, the expansion device 208 and the electrical generator 209 may be integrated into a single device.

At least a portion of the lubricating oil 124 may be extracted from refrigerant 254 in a separator 211, which may be, for example, a trap, a filter, etc. The lubricating oil 124 may be returned to the refrigerant 122 via a pump 218 and the mixing device 106. The low-pressure, hot refrigerant 254 may enter a condenser 210, where it may be cooled by a heat sink 242 to condense the refrigerant 254, forming a condensed refrigerant 258. The heat sink 242 may be cold water (e.g., culinary water, well water, etc.). The heat sink 242 may be at approximately ambient or room temperature. For example, the heat sink 242 may enter the condenser 210 at a temperature from about 5° C. to about 35° C., such as from about 15° C. to about 25° C. The heat sink 246 leaving the condenser 210 may be from about 1° C. to about 15° C. warmer than the heat sink 242, which temperature difference may depend on the flow rates of the heat sink 242 and refrigerant 254, as well as the temperatures thereof. The refrigerant 254 may be partially or fully condensed in the condenser 210.

The condensed refrigerant 258 may be transferred to a liquid refrigerant tank 212, where the condensed refrigerant 258 may optionally be further cooled by one or more additional heat sink 220 to form cooled refrigerant 260. The heat sink 220 may be, for example, cold water, a thermal expansion valve (TXV), a thermoelectric device, or any other material or device capable of absorbing or transferring heat. The heat engine 200 may be operable to use multiple heat sinks 220 of different types and at different temperatures. Heat sinks 220 may be added to balance heat loads with other processes. In some embodiments, the condensed refrigerant 258 or a portion thereof may be cycled through a conduit 270 out of the heat engine 200 to an external heat sink for cooling, and subsequently returned to the heat engine 200 through another conduit 272 (e.g., back to the liquid refrigerant tank 212). In such embodiments, the refrigerant may be considered as having a substantially closed-loop path that includes the heat engine 200 and the external heat sink.

A pressure control system 214 may regulate the flow and pressure of the cooled refrigerant 260 from the liquid refrigerant tank 212. The pressure control system 214 may include a check valve, a pressure regulator, a dampening chamber, a manual or electronic controller, and/or any other selected control device.

After passing through the pressure control system 214, heat sources(s) 222, 224 may optionally preheat the cooled refrigerant 260 to form a preheated refrigerant 262. The heat sources 222, 224 may be, for example, a waste heat source, exhaust gas, a compressor intercooler, biomass, a geothermal heat source, a solar array, or any other material or device capable of generating or transferring heat. In some embodiments, the cooled refrigerant 260 or a portion thereof may be cycled through a conduit 274 out of the heat engine 200 to an external heat source for heating, either instead of or in addition to the heat sources 222, 224, and subsequently returned to the heat engine 200 through another conduit 276. In such embodiments, the refrigerant may be considered as having a substantially closed-loop path that includes the heat engine 200 and the external heat source. Thus, the heat engine 200 may be operable to use multiple heat sources 222, 224 of different types and at different temperatures. Heat sources 222, 224 may be added to balance heat loads with other processes.

A circulation pump 216 may return the preheated refrigerant 262 to the holding tank 202, and may separate the low-pressure zone from the high-pressure zone. Thus, the low-pressure zone of the heat engine 200 may be defined to include the separator 211, the condenser 210, the liquid refrigerant tank 212, and the pressure control system 214. The circulation pump 216 may provide continuous flow of the preheated refrigerant 262 in the liquid phase from the low-pressure zone to the high-pressure zone. The circulation pump 216 may be, for example, a positive displacement hydraulic pump. The circulation pump 216 may be configured to operate as a liquid pressure booster pump, increasing the pressure of the preheated refrigerant 262 as it moves the preheated refrigerant 262 through the heat engine 200. Pumping the preheated refrigerant 262 in the liquid phase may be a relatively more efficient way to increase the pressure than pumping a gas-phase refrigerant. The holding tank 202 may optionally be further preheated by another heat source 226. The heat source 226 may be, for example, a waste heat source, exhaust gas, a compressor intercooler, biomass, a geothermal heat source, a solar array, or any other material or device capable of generating or transferring heat. The use of multiple heat sources 222, 224, 226 to preheat the refrigerant (in addition to the heat sources 204, 206) may increase the amount of energy generation by increasing the total amount of heat transferred to the refrigerant in the cycle.

The heat engine 200 includes a bypass zone, in which a relatively small amount of the refrigerant 122 is mixed with lubricating oil 124. The bypass zone may be defined to include the check valve 102, the pump 104, the mixing device 106, and the heat source 108.

The lubricating oil 124 may help to seal the expansion device 208 to limit or prevent slippage of the moving parts of the expansion device 208. The lubricating oil 124 may also increase the density of the refrigerant entering the expansion device 208 as the atomized mixture 142. However, if lubricating oil 124 passes through the expansion device 208 in bulk form, the lubricating oil 124 may stall the expansion device 208, such as by blocking flow of the refrigerant. Thus, in the bypass zone, the lubricating oil 124 may be pre-mixed with a portion of the refrigerant 122 to improve dispersion. The operation of units in the bypass zone (in particular, the check valve 102, the pump 104, the mixing device 106, and the heat source 108) are described above with respect to FIG. 1. The atomizer 112 may further promote dispersion of the lubricating oil 124 in the refrigerant, such that the lubricating oil 124 can effectively lubricate the moving parts of the expansion device 208 without inhibiting flow of the refrigerant. Thus, the lubricating oil 124 may increase the efficiency of the heat engine 200 (by reducing friction losses in the expansion device 208) and increase the expected operating life thereof.

The heat engine 200 may include a means for mixing the refrigerant 122 and lubricating oil 124 from the bypass zone with the refrigerant 140 from the superheater 206 before these materials enter the atomizer 112, such as in a mixing tee, a mix chamber, an aspirator, or any other means for mixing fluids. In some embodiments, these materials may be mixed within the atomizer 112 or within a body also containing the atomizer 112.

The atomized mixture 142 entering the expansion device 208 may be from about 0.01% to about 10% by mass (i.e., a ratio of a mass flow rate of the refrigerant 122, 140 to a mass flow rate of the lubricating oil 124 may be between about 10:1 and about 10,000:1). For example, the atomized mixture 142 may be from about 0.1% to about 1.0% by mass (i.e., a ratio of the mass flow rate of the refrigerant 122, 140 to the mass flow rate of the lubricating oil 124 may be between about 100:1 and about 1000:1). The atomized mixture 142 may be about 5.0% by mass (i.e., a ratio of the mass flow rate of the refrigerant 122, 140 to the mass flow rate of the lubricating oil 124 may be about 20:1).

A method for generating power from a heat source includes mixing a portion of the refrigerant in a liquid phase with a lubricating oil, heating the mixture to evaporate the portion of the refrigerant, mixing the heated mixture with a superheated portion of the refrigerant, atomizing the lubricating oil, and passing the atomized lubricating oil and the refrigerant through a decompressor coupled with an electrical generator to generate an electrical current. At least a portion of the lubricating oil may then be separated from the refrigerant, and the refrigerant may be condensed back to liquid form.

The power may be generated without using a compressor, and thus, the power output may be higher than power output from a conventional heat engine with the same inputs. That is, the heat engine may be more efficient in power conversion than conventional systems.

In the heat engine 200, heat flows into the refrigerant in the heat sources 204, 206. The heat is converted to mechanical work, and to electricity in the expansion device 208 and electrical generator 209. Waste heat is removed from the heat engine 200 via the condenser 210. Minor amounts of energy are consumed pumping the refrigerant, lubricating oil, and heat sources and sinks (e.g., water), but the heat engine 200 does not require a compressor to produce pressurized refrigerant 140 (FIG. 1). Thus, the heat engine 200 may operate more efficiently than conventional heat engines.

Figure 4:
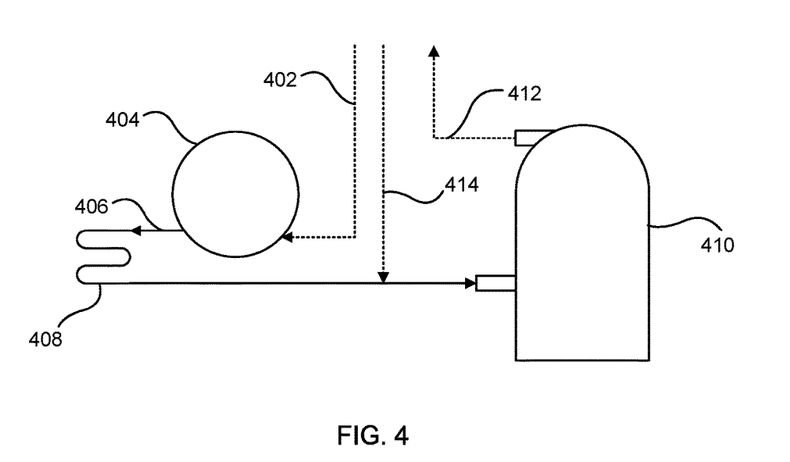
FIG. 4 is a simplified schematic block diagram illustrating how refrigerant in the heat engine shown in FIG. 2 may be used in conjunction with other equipment.

Refrigerant may be extracted from the heat engine 200, used in another device or operation, and returned to the heat engine 200. For example, and as shown in FIG. 4, a refrigerant 402 in liquid form may enter a thermal expansion device 404. The refrigerant 402 may be converted to a gaseous refrigerant 406. A coil 408 may be used as a heat sink for refrigeration or air conditioning.

The gaseous refrigerant 406 may enter a variable-speed compressor 410, which may produce a pressurized hot gaseous refrigerant 412 suitable for return to the heat engine 200 (FIG. 2). Another gaseous refrigerant 414 may also be compressed in the variable-speed compressor 410, instead of or in addition to the gaseous refrigerant 406. The amount of energy required to operate the variable-speed compressor 410 such that the pressurized hot gaseous refrigerant 412 may be returned to the heat engine 200 may be less than the energy required to operate conventional cooling equipment.

Returning to FIG. 2, the refrigerant 402 in liquid form may be separated from the refrigerant 248 (either before or after the heat source 204), or any other selected point in the heat engine 200. The refrigerant 414 in gaseous form may be separated from the refrigerant 254, the refrigerant 258, or any other selected point in the heat engine 200. The pressurized hot gaseous refrigerant 412 may be returned to the heat engine 200 after the circulation pump 216, after the holding tan 202, or at any other appropriate location. Because the heat engine 200 has high-pressure zone and a low-pressure zone, the extraction or addition point for refrigerants may be at any point within each zone. That is, by matching the pressure, the refrigerant may flow and mix with refrigerant in the heat engine 200 without the need for additional conditioning.

EXAMPLES

Prophetic Example 1: Mathematical Modeled Heat Engine

A heat engine similar to the heat engine 200 shown in FIG. 2 is expected to produce 9.88 kW of electricity from a hot water source at 69.0° C., with a cold water source at 17.0° C., using R-410A refrigerant. The expansion device 208 is an orbital scroll, a commercially available scroll compressor designed for air conditioning, model SH380, available from Danfoss A/S, of Nordborg, Denmark, operating at 1517 RPM. The compressor is operated in the reverse orientation of its intended use—thus it operates as an expander rather than as a compressor.

Calculated pressures and temperatures for the refrigerant and the hot and cold water supplies are shown in Table 1.

TABLE 1

Operating Pressures and Temperatures

|  | Temperature (° C.) | Pressure (bar) |
|---|---|---|
| Evaporator hot water, inlet | 69.0 |  |
| Evaporator hot water, outlet | 63.0 |  |
| Condenser cooling water, inlet | 17.0 |  |
| Condenser cooling water, outlet | 21.0 |  |
| Refrigerant at circulation pump outlet | 23.0 | 36.0 |
| Refrigerant at evaporator inlet | 23.0 | 36.0 |
| Refrigerant at superheater outlet | 67.0 | 36.0 |
| Refrigerant at scroll inlet | 67.0 | 36.0 |
| Refrigerant at scroll outlet | 21.5 | 15.6 |
| Refrigerant at condenser inlet | 21.5 | 15.0 |
| Refrigerant at condenser outlet | 21.0 | 15.0 |
| Refrigerant at circulation pump inlet | 21.0 | 15.0 |

Additional operating parameters are shown in Table 2.

TABLE 2

Other Operating Parameters

| Refrigerant mass flow | 304.5 g/s |
|---|---|
| Hot water flow | 282 l/min |
| Cold water flow | 482 l/min |
| Heat transfer from hot water to refrigerant | 113.4 kW |
| Heat transfer from refrigerant to cold water | 112.0 kW |
| Carnot efficiency (theoretical maximum) | 15.20% |
| Maximum work output | 17.23 kW |
| Gross work output from scroll | 11.14 kW |
| Gross efficiency | 9.83% |
| Gross percentage of Carnot efficiency | 64.7% |
| Power consumed by pumps (oil pump, refrigerant pump, and water pumps) | 1.27 kW |
| Net power produced | 9.88 kW |
| Net efficiency | 8.71% |
| Net percentage of Carnot efficiency | 57.3% |

Example 2: Heat Engine Operating at 1,500 RPM

A heat engine similar to the heat engine 200 shown in FIG. 2 was operated to produce about 11 kW of electricity from a hot water source at about 68.9° C., with a cold water source at about 16.3° C., using R-410A refrigerant. The expansion device 208 was an orbital scroll, a commercially available scroll compressor designed for air conditioning, model SH380, from Danfoss A/S, operating at about 1,500 RPM. Selected operating parameters as observed are shown in Table 3.

TABLE 3

Observed Operating Parameters

| Evaporator hot water, inlet | 68.9° C. |
|---|---|
| Evaporator hot water, outlet | 61.8° C. |
| Hot water flow | 260 l/min |
| Condenser cooling water, inlet | 16.3° C. |
| Condenser cooling water, outlet | 12.7° C. |
| Cold water flow | 485 l/min |
| Carnot efficiency (theoretical maximum) | 15.3% |

TABLE 3-continued

Observed Operating Parameters

| Net power produced | 11 kW |
|---|---|
| Net efficiency | 8.8% |
| Net percentage of Carnot efficiency | 57.5% |

Example 3: Heat Engine Operating at 1121 RPM

A heat engine similar to the heat engine 2 shown in FIG. 200 was operated to produce about 6 kW of electricity from a hot water source at about 58.1° C., with a cold water source at about 15.5° C., using R-410A refrigerant. The expansion device 208 was an orbital scroll, a commercially available scroll compressor designed for air conditioning, model SH380, available from Danfoss A/S, operating at about 1,121 RPM. Selected operating parameters as observed are shown in Table 4.

TABLE 4

Observed Operating Parameters

| Evaporator hot water, inlet | 58.1° C. |
|---|---|
| Evaporator hot water, outlet | 52.2° C. |
| Hot water flow | 191 l/min |
| Condenser cooling water, inlet | 15.5° C. |
| Condenser cooling water, outlet | 12.4° C. |
| Cold water flow | 376 l/min |
| Carnot efficiency (theoretical maximum) | 12.9% |
| Net power produced | 6 kW |
| Net efficiency | 7.1% |
| Net percentage of Carnot efficiency | 55.0% |

Additional non limiting example embodiments of the disclosure are described below.

Embodiment 1

A method includes mixing a lubricating oil with a first portion of a refrigerant in a liquid phase to form a mixture and heating the mixture of the lubricating oil and the first portion of the refrigerant to form a heated mixture, wherein at least a portion of the first portion of the refrigerant is in a gaseous phase. The method includes mixing the heated mixture with a second portion of the refrigerant in a superheated phase and atomizing the lubricating oil to disperse the lubricating oil within the refrigerant.

Embodiment 2

The method of Embodiment 1, wherein atomizing the lubricating oil comprises passing the lubricating oil and the refrigerant through a metal mesh.

Embodiment 3

The method of Embodiment 1 or Embodiment 2, further comprising pumping the first portion of the refrigerant through a conduit before mixing the lubricating oil therewith.

Embodiment 4

The method of any of Embodiments 1 through 3, wherein heating the mixture of the lubricating oil and the first portion of the refrigerant to form a heated mixture comprises transferring heat to the mixture from at least one source selected from the group consisting of a waste heat source, an exhaust gas, a compressor intercooler, biomass, a geothermal heat source, and a solar array.

Embodiment 5

The method of any of Embodiments 1 through 4, wherein the refrigerant exhibits a boiling point below about −35° C.

Embodiment 6

The method of any of Embodiments 1 through 5, further comprising: passing the atomized lubricating oil and the refrigerant through a decompressor operatively associated with an electrical generator to decrease a pressure of the refrigerant and generate an electrical current; separating at least a portion of the lubricating oil from the refrigerant; and condensing at least a portion of the refrigerant to re-form the first portion of the refrigerant.

Embodiment 7

The method of Embodiment 6, wherein condensing at least a portion of the refrigerant to form the first portion of the refrigerant comprises transferring heat from the refrigerant to each of a first heat sink and a second heat sink.

Embodiment 8

The method of any of Embodiments 1 through 7, wherein heating the mixture of the lubricating oil and the first portion of the refrigerant to form a heated mixture comprises increasing a specific volume of the mixture.

Embodiment 9

The method of any of Embodiments 1 through 8, further comprising passing the atomized lubricating oil and the refrigerant through a replaceable filter.

Embodiment 10

The method of any of Embodiments 1 through 9, wherein atomizing the lubricating oil comprises maintaining the lubricating oil and the refrigerant at approximately constant pressure.

Embodiment 11

The method of any of Embodiments 1 through 10, further comprising mixing an additive with the mixture, the additive exhibiting a higher lubricity than the lubricating oil.

Embodiment 12

The method of any of Embodiments 1 through 11, wherein mixing a lubricating oil with a first portion of a refrigerant to form a mixture comprises mixing the first portion of the refrigerant in a liquid phase with the lubricating oil downstream of a pump circulating the first portion of the refrigerant.

Embodiment 13

A heat engine comprising a high-pressure zone configured to transfer heat from at least one heat source to a refrigerant and configured to contain a first portion of the refrigerant in a gaseous phase; a low-pressure zone configured to transfer heat from the refrigerant to at least one heat sink and configured to contain a second portion of the refrigerant in a liquid phase; a bypass zone configured to mix a third portion of the refrigerant in a liquid phase with a lubricating oil; and an atomizer comprising a mixing media configured to atomize the lubricating oil and disperse the lubricating oil within the first and third portions of the refrigerant. The refrigerant exhibits a boiling point below about −35° C. A substantially closed-loop path for the refrigerant comprises the high-pressure zone, the low-pressure zone, and the bypass zone.

Embodiment 14

The heat engine of Embodiment 13, wherein the heat engine is configured to circulate the refrigerant in a Rankine cycle.

Embodiment 15

The heat engine of Embodiment 13 or Embodiment 14, further comprising a mixing device configured to mix the lubricating oil with the third portion of the refrigerant in the liquid phase.

Embodiment 16

The heat engine of any of Embodiments 13 through 15, wherein the high-pressure zone comprises at least one wall of the at least one heat source configured to transfer heat from the at least one heat source to the first portion of the refrigerant in the liquid phase, wherein the at least one heat source is configured to evaporate the first portion of the refrigerant.

Embodiment 17

The heat engine of any of Embodiments 13 through 16, further comprising a positive displacement decompressor configured to provide a pressure gradient through which the refrigerant in the gaseous phase flows continuously from the high-pressure zone to the low-pressure zone, the positive displacement decompressor configured to maintain a pressure differential between the high-pressure zone and the low-pressure zone of between about 20 bar and about 42 bar, the positive displacement decompressor configured to extract mechanical energy due to the pressure gradient.

Embodiment 18

The heat engine of Embodiment 17, further comprising an electrical generator coupled to the positive displacement decompressor and configured to convert the extracted mechanical energy to electrical energy.

Embodiment 19

The heat engine of Embodiment 18, further comprising a positive displacement hydraulic pump for providing continuous flow of the refrigerant in the liquid phase from the low-pressure zone to the high-pressure zone.

Embodiment 20

The heat engine of any of Embodiments 13 through 19, wherein the at least one heat source comprises a material having a temperature of less than about 60° C.

Embodiment 21

The heat engine of any of Embodiments 13 through 20, wherein the refrigerant circulates through the closed-loop path absorbing additional heat without passing through a compressor.

Embodiment 22

The heat engine of any of Embodiments 13 through 21, wherein the refrigerant absorbs or rejects heat while circulating through the closed-loop path without passing through a compressor.

Embodiment 23

The heat engine of any of Embodiments 13 through 22, wherein a ratio of a mass flow rate of a sum of the first and third portions of the refrigerant to a mass flow rate of the lubricating oil is between about 10:1 and about 100:1.

Embodiment 24

The heat engine of any of Embodiments 13 through 23, wherein the substantially closed-loop path further comprises at least one heat-transfer conduit external to the heat engine.

Embodiment 25

A system for providing a pressurized refrigerant comprises a pump configured to move a first portion of a refrigerant in a liquid phase through a conduit; a mixing device for mixing a lubricating oil with the first portion of the refrigerant in the liquid phase; at least one heat source configured to transfer heat to the first portion of the refrigerant in the liquid phase; another mixing device for mixing a second portion of the refrigerant in a gaseous phase with the lubricating oil and the first portion of the refrigerant; and a mixing media configured to atomize the lubricating oil and disperse the lubricating oil within the refrigerant. The refrigerant exhibits a boiling point below about −35° C. The at least one heat source is configured to evaporate the first portion of the refrigerant.

Embodiment 26

The system of Embodiment 25, wherein the mixing media comprises metal mesh.

Embodiment 27

The method, system, or heat engine of any of Embodiments 1 through 26, wherein the refrigerant comprises an organic refrigerant.

Embodiment 28

The method, system, or heat engine of any of Embodiments 1 through 26, wherein the refrigerant comprises ammonia.

Embodiment 29

The method, system, or heat engine of any of Embodiments 1 through 26, wherein the refrigerant comprises carbon dioxide.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the disclosure as contemplated by the inventors. Further, embodiments of the disclosure have utility with different and various heat engine types.

What is claimed is:

1. A method comprising:
   mixing a lubricating oil with a first portion of a refrigerant in a bypass zone of a heat engine to form a mixture, the first portion of the refrigerant in a liquid phase;
   heating the mixture of the lubricating oil and the first portion of the refrigerant in a high-pressure zone of the heat engine to form a heated mixture, wherein at least a portion of the first portion of the refrigerant is in a gaseous phase, wherein the refrigerant exhibits a boiling point below −35° C.;
   mixing the heated mixture with a second portion of the refrigerant, the second portion of the refrigerant in a superheated phase;
   atomizing the lubricating oil in an atomizer comprising a mixing media to disperse the lubricating oil within the refrigerant; and
   cooling the refrigerant in a low-pressure zone of the heat engine through at least one heat sink;
   wherein the high-pressure zone, the low-pressure zone, and the bypass zone form a closed-loop path for the refrigerant.

2. The method of claim 1, wherein atomizing the lubricating oil comprises passing the lubricating oil and the refrigerant through a metal mesh.

3. The method of claim 1, wherein heating the mixture of the lubricating oil and the first portion of the refrigerant to form a heated mixture comprises transferring heat to the mixture from at least one source selected from the group consisting of a waste heat source, an exhaust gas, a compressor intercooler, biomass, a geothermal heat source, and a solar array.

4. The method of claim 1, further comprising:
   passing the atomized lubricating oil and the refrigerant through a decompressor operatively associated with an electrical generator to decrease a pressure of the refrigerant and generate an electrical current;
   separating at least a portion of the lubricating oil from the refrigerant; and
   condensing at least a portion of the refrigerant to re-form the first portion of the refrigerant.

5. The method of claim 4, wherein the at least one heat sink comprises a first heat sink and a second heat sink, and wherein condensing at least a portion of the refrigerant to form the first portion of the refrigerant comprises transferring heat from the refrigerant to each of the first heat sink and the second heat sink.

6. The method of claim 1, wherein heating the mixture of the lubricating oil and the first portion of the refrigerant to form a heated mixture comprises increasing a specific volume of the mixture.

7. The method of claim 1, wherein atomizing the lubricating oil comprises maintaining the lubricating oil and the refrigerant at constant pressure.

8. The method of claim 1, further comprising mixing an additive with the mixture, the additive exhibiting a higher lubricity than the lubricating oil.

9. The method of claim 1, wherein mixing a lubricating oil with a first portion of a refrigerant to form a mixture comprises mixing the first portion of the refrigerant in a liquid phase with the lubricating oil downstream of a pump circulating the first portion of the refrigerant.

10. A heat engine, comprising:
- a high-pressure zone configured to transfer heat from at least one heat source to a refrigerant and configured to contain a first portion of the refrigerant in a gaseous phase, the refrigerant exhibiting a boiling point below −35° C.;
- a low-pressure zone configured to transfer heat from the refrigerant to at least one heat sink and configured to contain a second portion of the refrigerant in a liquid phase;
- a bypass zone configured to mix a third portion of the refrigerant with a lubricating oil, the third portion of the refrigerant and the lubricating oil in a liquid phase; and
- an atomizer comprising a mixing media configured to atomize the lubricating oil and disperse the lubricating oil within the first and third portions of the refrigerant;
- wherein a closed-loop path for the refrigerant comprises the high-pressure zone, the low-pressure zone, and the bypass zone.

11. The heat engine of claim 10, wherein the heat engine is configured to circulate the refrigerant in a Rankine cycle.

12. The heat engine of claim 10, further comprising a mixing device configured to mix the lubricating oil with the third portion of the refrigerant in the liquid phase.

13. The heat engine of claim 10, wherein the high-pressure zone comprises at least one wall of the at least one heat source configured to transfer heat from the at least one heat source to the first portion of the refrigerant in the liquid phase, wherein the at least one heat source is configured to evaporate the first portion of the refrigerant.

14. The heat engine of claim 10, further comprising a positive displacement decompressor configured to provide a pressure gradient through which the refrigerant in the gaseous phase flows continuously from the high-pressure zone to the low-pressure zone, the positive displacement decompressor configured to maintain a pressure differential between the high-pressure zone and the low-pressure zone of between 20 bar and 42 bar, the positive displacement decompressor configured to extract mechanical energy due to the pressure gradient.

15. The heat engine of claim 14, further comprising an electrical generator coupled to the positive displacement decompressor and configured to convert the extracted mechanical energy to electrical energy.

16. The heat engine of claim 15, further comprising a positive displacement hydraulic pump for providing continuous flow of the refrigerant in the liquid phase from the low-pressure zone to the high-pressure zone.

17. The heat engine of claim 10, wherein the closed-loop path further comprises at least one heat-transfer conduit external to the heat engine.

* * * * *